United States Patent [19]
Rand et al.

[11] 3,952,524
[45] Apr. 27, 1976

[54] PIPE LAYING METHOD AND APPARATUS

[76] Inventors: Burgess F. Rand, 1011 NE. Eighth Ave., Fort Lauderdale, Fla. 33304; Dane R. Hancock, 822 SW. 14th St., Fort Lauderdale, Fla. 33315

[22] Filed: Jan. 4, 1974

[21] Appl. No.: 430,701

[52] U.S. Cl. ................................ 61/43; 61/72.3; 29/237; 29/421 R; 29/450
[51] Int. Cl.² ........................................ E01G 4/04
[58] Field of Search ................ 61/43, 72.1, 72.3; 285/18; 29/421, 237, 450

[56] References Cited
UNITED STATES PATENTS

| | | |
|---|---|---|
| 730,135 | 6/1903 | Lake ........................................ 61/43 |
| 2,877,628 | 3/1959 | Maunsell ................................. 61/43 |
| 3,380,256 | 4/1968 | Rebikoff ................................. 61/46.5 |

*Primary Examiner*—Jacob Shapiro
*Attorney, Agent, or Firm*—Malin & Haley

[57] ABSTRACT

An improved method and apparatus for coupling together conduit sections to form a pipeline while submerged in a fluid medium. During the operation of laying the pipeline while submerged in a fluid meduim, such as the ocean, adjacent pipe sections to be joined are subjected to a reduction in internal fluid pressure with a pump or the like so that during the joining operation, the pressure inside the adjacent pipe sections is lower than the exterior fluid pressure causing the pipes to readily come together and seat properly.

2 Claims, 3 Drawing Figures

PIPE LAYING METHOD AND APPARATUS

BACKGROUND OF THE INVENTION

This invention relates generally to a method and apparatus for coupling together conduits to form a pipeline, and more specifically to a submarine pipeline coupling method and apparatus which reduces the amount of labor and time required to connect submerged pipe sections while increasing the resultant seal formed between the connection of the two pipes.

In the past, submerged coupling operations for large conduits, such as are utilized for sewage outfalls or the like, has required several divers which are necessary to line up and mechanically join the pipe section ends together. Additional equipment is necessary such as come-alongs and collars to hold both sections of the pipe in alignment to allow maneuvering and seating of the pipe section to be added. Tension bolts and nuts require additional time, cost and labor and oftentimes do not provide an adequate means of alignment for pipe section ends to be joined together.

Applicant's improved method and apparatus for connecting submerged pipe sections reduces the number of workmen and time required to complete a pipeline while increasing the section sealing capability by providing a relatively lower fluid pressure inside the pipe sections to be joined which creates a pressure differential between the interior and the exterior of the sections and adds an axial longitudinal force which acts to draw the pipe sections together. The greater exterior pressure of the surrounding fluid acts to uniformly compress the pipe ends circumferentially reducing any diametral dimensional deviations and variations in the normally circular pipe section ends.

BRIEF DESCRIPTION OF THE INVENTION

An improved submarine pipeline laying method and the apparatus required thereof, the method comprising the steps of: placing the free end of a first conduit adjacent the free end of a second conduit, the free ends of the first and second conduits to be coupled together in a sealed joint; creating a relatively lower fluid pressure inside said second conduit which reduces the internal fluid pressure; and positioning and joining the first and second conduit ends adjacent each other while continuing the pressure reduction through said second conduit whereby the first and second conduit free ends will be coupled together while experiencing lower internal fluid pressure.

In operation, two sections of the conduit to be joined are positioned to align the longitudinal axis of each section while the ends to be joined are placed adjacent each other. A fluid pump is sealably mounted across the open end of one of the conduit sections, while a fluid barrier is placed across the opposite open end of the other conduit section. The pump is energized drawing fluid out of both conduit sections, creating a relatively lower internal conduit fluid pressure, the conduit sections being joined together during the pumping operation.

It is an object of this invention to provide an improved method and apparatus for joining conduit sections in a submarine environment.

It is another object of this invention to provide an improved method and apparatus for joining together two or more conduits in a fluid environment.

And yet still another object of this invention is to provide a method for coupling and seating together a pair of conduits submerged in a fluid medium by providing a pressure differential between the surrounding external fluid medium and internal fluid medium of the conduit during the coupling operation.

In accordance with these and other objects which will be apparent hereinafter, the instant invention will now be described with particular reference to the accompanying drawings.

PREFERRED EMBODIMENT OF THE INVENTION

Figure 1:
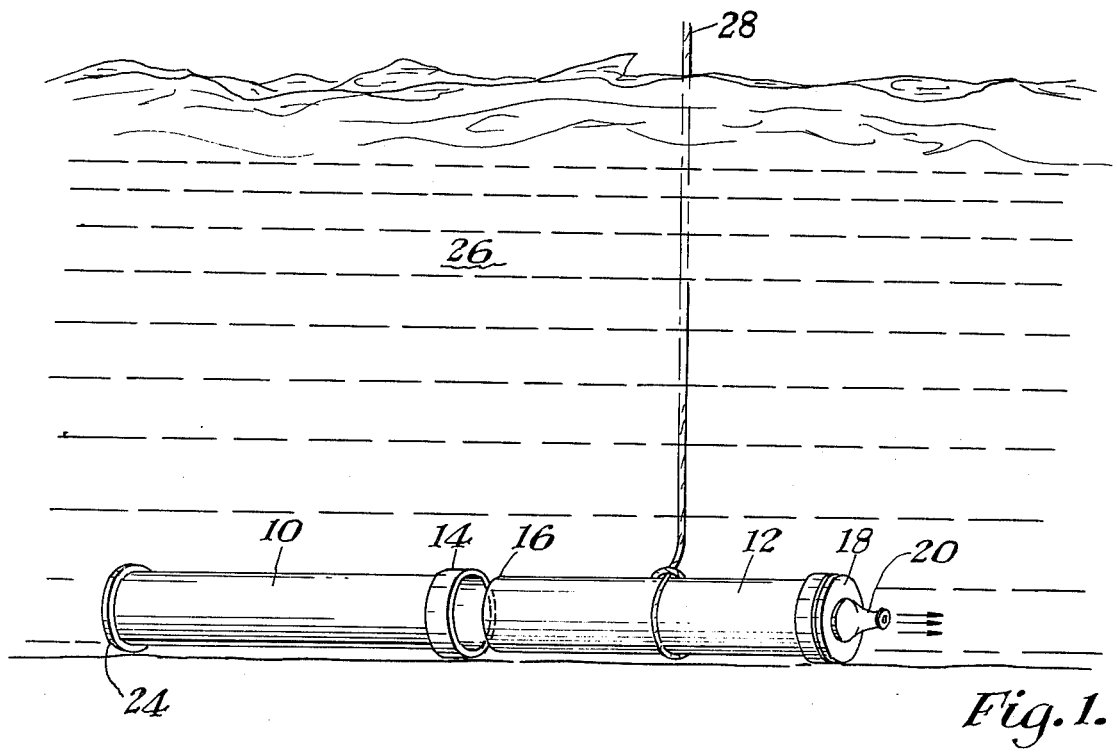
FIG. 1 shows a perspective view of Applicant's invention.

Referring now to the drawings and in particular FIG. 1, conduits 10 and 12 are shown submerged in a body of water, such an an ocean 26, conduit 10 having a female end coupling 14 sized to receive the male end of conduit 12 having a spigot portion 16. A watertight bulkhead 24 is mounted across the male end of conduit 10. The conduit 12 to be joined to conduit 10 may be lowered into position by a cable 28 which is connected circumferentially around conduit 12. A second watertight barrier 18 having a pump receiving aperture is placed across the female end of conduit 12. A fluid pump 20 is mounted in the aperture of barrier 18.

In operation, the conduit 12 is lowered into position and substantially axially aligned with the conduit 10 so that male end 16 of the conduit 12 is in proximate position t0 the female end 14 of the conduit 10. At this time the pump 20 is actuated initiating a fluid flow (shown by the arrows) which reduces internal fluid pressure in conduits 10 and 12 in the direction of the barrier 18, the water being drawn and expelled by pump 20 into the surrounding sea water. As conduit 12 is brought adjacent conduit 10, the water in conduit 10 which is initially at surrounding sea level pressure is then drawn into conduit 12 creating a lower fluid pressure inside both conduits 10 and 12. This lower internal pressure acts to join and seat the conduits together. As the conduit ends get closer, the pressure differential becomes greater and the force acting to seat and couple the two conduits together increases.

Figure 2:
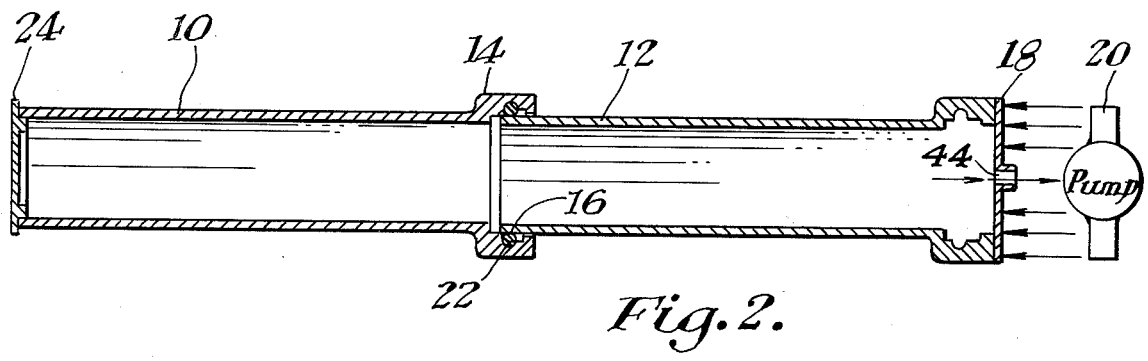
FIG. 2 shows a cross-sectional view of a pair of conduits with appropriate fluid flow arrows which indicate fluid flow utilizing Applicant's operation of joining the pipes together.

FIG. 2 shows the conduit 12 joined with conduit 10 so that the male end 16 and female end 14 are sealed with a gasket 22. During the terminal coupling positioning, the external water pressure (which is significantly higher than the pressure inside both conduits at this time) acts to further seat the conduit ends together by providing uniform circumferential external force which reduces diametral end surface deviations present if either or both conduit ends are not perfectly round.

In the preferred embodiment, Applicant uses a submersible pump which provides a variable pressure differential between the inside and outside of the conduits dependent on the pump capability. It should be noted that by providing a reduced pressure in the conduits resultant axial forces on the barrier 24 and barrier 18, with arrow illustrations terminating at barrier 18, tend to force conduit 12 into a seated relationship with conduit 10. The pump 20, illustrated by a standard symbol, is shown to the right of its normal position in opening 44.

Thus, utilization of Applicant's apparatus and method of joining submerged conduits eliminates the necessity for come-alongs and collars, additional workmen, and the tension bolting to achieve a sealed coupling between the conduits. Applicant's invention may be utilized in any fluid environment to join together conduits in which a reduced pressure can be provided axially along the conduits for proper joining and sealing.

In an alternate embodiment pipe sections can be layed in two directions with the utilization of a "Tee" section of conduit, with a pump drawing fluid into both branches of the "Tee" section while conduit sections are coupled to each branch of the "Tee" simultaneously, with fluid barriers being placed across the open ends of the sections to be coupled to the "Tee" section.

Figure 3:
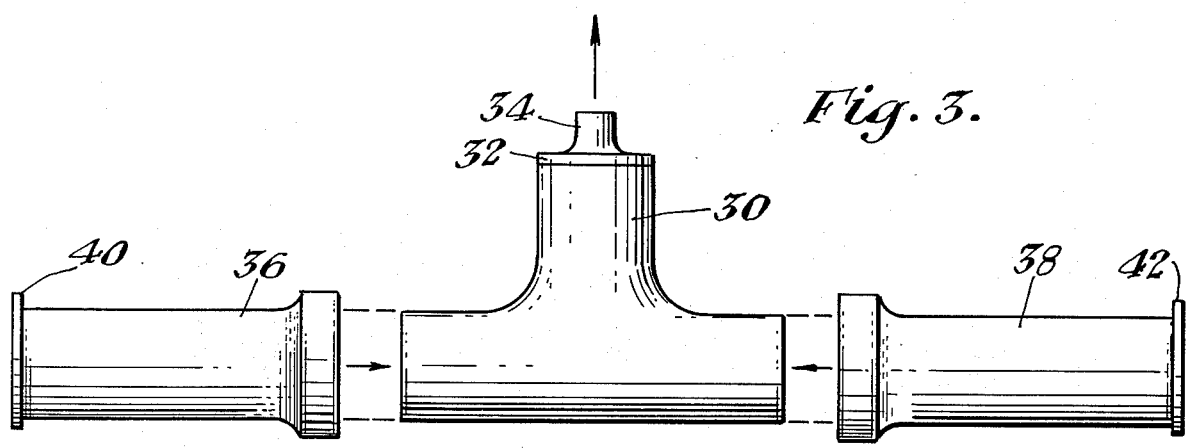
FIG. 3 shows a side elevational view of an alternate embodiment of Applicant's invention.

FIG. 3 shows the alternate embodiment of Applicant's invention in which the pipeline may be laid in two directions at the same time. A "Tee" section of conduit 30 has pump 34 with a water-tight barrier 32 connected thereto across the top branch of "Tee" section 30. A pair of conduits 36 and 38 are joined to the "Tee" section end portions by placing water-tight barriers 40 and 42 respectively across their open end portions. The suction is applied by pump 34 in the direction of the arrows which drives fluid into the "Tee" section from both sides thus reducing the pressure internally in conduits 36 and 38 which allows for the coupling together of the conduits to the "Tee" section. Additional sections may be added in each direction to construct a pipeline in which case the water-tight barriers will then be removed and placed on the open ends of the next conduits to be added to the entire pipeline. T is alternate embodiment allows the pipeline to be formed in two directions simultaneously while utilizing a single pump.

In either embodiment, after the conduit sections are joined, the pump and the fluid barriers are removed.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. The method of joining together a first conduit having first and second open ends and a second conduit having first and second open ends in a substantially incompressible liquid environment comprising the steps of:
    a. positioning the second free end of said first conduit adjacent the first free end of said second conduit;
    b. placing a sealed liquid barrier over the first free end of said first conduit;
    c. placing a sealed liquid barrier over the second free end of said second conduit, said second free end barrier having a pump disposed therethrough;
    d. pumping said substantially incompressible liquid from within said first and second conduits out through the second free end of said second conduit along the longitudinal axis of said first conduit whereby the reduced liquid pressure within the first and second conduit form a pressure differential across the first end of said conduit and the second end of said second conduit creating a longitudinal axial force joining the first and second conduits together.

2. The method of joining together a first conduit having first and second open ends and a second conduit having first and second open ends in a substantially incompressible liquid environment comprising the steps of:
    a. submersing said first conduit and said second conduit in said liquid medium such that the liquid medium fills said first conduit and said second conduit such that the liquid medium and pressure within said first and second conduits and said surrounding liquid medium is equal;
    b. aligning the conduits along a common longitudinal axis;
    c. positioning the second free end of said first conduit adjacent the first free end of said second conduit;
    d. sealing the first free end of said first conduit to prevent exterior liquid flow therethrough;
    e. providing a reaction force at the second free end of said second conduit for moving said second conduit by pumping liquid out of said first and second conduits through the second free end of said second conduit whereby the liquid expelled out from within said first and second conduits generates a longitudinal reaction axial force along the direction of the longitudinal axis of the conduits for moving said second conduit adjacent said first conduit to provide a coupling of said first and second conduits.

* * * * *